US006834720B1

(12) United States Patent
Dwyer et al.

(10) Patent No.: US 6,834,720 B1
(45) Date of Patent: Dec. 28, 2004

(54) METHOD AND APPARATUS FOR INJECTING PARTICULATE MEDIA INTO THE GROUND

(75) Inventors: Brian P. Dwyer, Albuquerque, NM (US); Stephen F. Dwyer, Albuquerque, NM (US); Francine S. Vigil, Albuquerque, NM (US); Willis E. Stewart, W. Richland, WA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/309,502

(22) Filed: Dec. 3, 2002

Related U.S. Application Data

(60) Provisional application No. 60/337,258, filed on Dec. 3, 2001.

(51) Int. Cl.[7] ................................................ E21B 33/13

(52) U.S. Cl. ..................... 166/289; 166/290; 166/117.4

(58) Field of Search ................................ 166/289, 290, 166/177.4

(56) References Cited

U.S. PATENT DOCUMENTS

| | | | | | |
|---|---|---|---|---|---|
| 3,802,203 A | * | 4/1974 | Ichise et al. | ................ | 405/264 |
| 5,484,233 A | * | 1/1996 | Kunito | ........................ | 405/240 |
| 5,624,209 A | | 4/1997 | Melegari | | |
| 5,765,965 A | | 6/1998 | Carter | | |
| 5,860,907 A | | 1/1999 | Kauschinger | | |
| 5,908,267 A | | 6/1999 | Schuring | | |
| 5,944,454 A | | 8/1999 | Melegari | | |
| 5,957,624 A | | 9/1999 | Carter | | |
| 5,980,446 A | | 11/1999 | Loomis | | |
| 6,012,517 A | * | 1/2000 | Schuring et al. | .............. | 166/53 |
| 6,050,337 A | | 4/2000 | Melegari | | |
| 6,254,524 B1 | | 7/2001 | Kauschinger | | |
| 6,397,864 B1 | | 6/2002 | Johnson | | |

FOREIGN PATENT DOCUMENTS

| | | | |
|---|---|---|---|
| JP | 6-346436 | * | 12/1994 |

* cited by examiner

*Primary Examiner*—William Neuder
(74) *Attorney, Agent, or Firm*—Robert D. Watson

(57) ABSTRACT

An improved method and apparatus for injecting particulate media into the ground for constructing underground permeable reactive barriers, which are used for environmental remediation of subsurface contaminated soil and water. A media injector sub-assembly attached to a triple wall drill string pipe sprays a mixture of active particulate media suspended in a carrier fluid radially outwards from the sub-assembly, at the same time that a mixing fluid is sprayed radially outwards. The media spray intersects the mixing spray at a relatively close distance from the point of injection, which entrains the particulate media into the mixing spray and ensures a uniform and deep dispersion of the active media in the surrounding soil. The media injector sub-assembly can optionally include channels for supplying compressed air to an attached down-the-hole hammer drive assembly for use during drilling.

28 Claims, 16 Drawing Sheets

METHOD AND APPARATUS FOR INJECTING PARTICULATE MEDIA INTO THE GROUND

CROSS-REFERENCE TO RELATED APPLICATIONS

This application claims the benefit of U.S. patent application Ser. No. 60/337,258 "Apparatus for Mixing Dry Material at the Jet Grouting Fluid Nozzle Outlet Orifice Area During the Construction of Underground Barriers", by B. P. Dwyer, et al., filed Dec. 3, 2001, which is incorporated herein by reference.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

This invention relates to methods and equipment for treatment and remediation of contaminated soil and groundwater, with emphasis on improved in-situ methods and equipment for efficiently delivering of active treatment agents to the contaminated region.

A primary objective of environmental remediation of subsurface contamination is to remove or treat the contamination when possible; and when removal or treatment is not possible, to provide interim containment of mobile hazardous and/or radioactive waste constituents. Examples of contaminants of concern include pesticide-contaminated soil and/or groundwater, benzene vapors, or non-aqueous phase liquids, such as gasoline leaking from a buried storage tank. An underground barrier, whether permeable or impermeable, can be used to contain, remediate, and/or redirect the flow of contaminated groundwater. An impermeable subsurface barrier wall is typically made of a substantially impermeable material that prevents the migration of mobile waste forms through the relatively permeable surrounding ground (soil, sand, etc.). Neat cement-based grout (a well-known mixture of Portland cement and water), mixed with the surrounding soil, is commonly used as a ground-hardening material to fabricate impermeable underground barrier walls. The neat cement is vigorously mixed with the soil to ensure the soil aggregate acts as a binder. The cement/soil mixture can be used to backfill trenches that have been dug (which is limited to a depth of less than 40 feet).

Advancing this technology, the underground barrier wall can be constructed of reactive materials that actively remediate (i.e., remove or transform) contaminants, as opposed to simply blocking movement or confining with impermeable barriers. Conceptually, permeable reactive barriers (PRB's) are used to intercept and remove ground water contaminants in-situ before passing into the wider ecosystem (see FIG. 1). The barrier can be constructed of benign permeable reactive media (PRM), such as small, solid particles of zero-valent (metallic) iron that are used to breakdown or immobilize contaminants (e.g., by redox reduction) using ordinary chemical, physical, and/or biological means (the word "barrier" is defined herein to include zones that are permeable to the passage of water, other liquids, or gases). Treated, uncontaminated groundwater then exits from the barrier and is returned to the aquifer.

Currently, reactive barrier technology is practically limited to use in excavated trenches at depths of less than 40 feet, due to problems with injecting dry particulate media to greater depths using drill strings. Experimental attempts at greater depth placement have used fluid-based viscosifying agents to inject PRM into subsurface regions. Viscosifying/suspension agents (e.g., organic guar, with a viscosity like molasses) have been used to suspend the often-dense PRM (e.g., iron particles) to facilitate pumping and injection using high-pressure systems. Problems with this method include non-uniformity of the mixture and retention of the viscosifier in the treatment zone, potentially causing permeability reduction problems, biological growth abnormalities, and other problems.

Underground reactive barrier walls (or zones) can be fabricated in-situ using modified (i.e., hybrid) jet grouting techniques. The term "jet grouting" refers to the use of one or more high-pressure jet spray nozzles, which are located on a jet grout injector sub-assembly attached to the end of a drill string, to inject slurry-like materials at relatively high velocity radially outwards into the surrounding soil. The high-velocity jet spray simultaneously masticates and erodes the surrounding soil, while dispersing and blending the injected slurry with the loosened soil. If the slurry is primarily made of cement-based grout, then the mixture of soil and grout subsequently hardens into a solid, substantially impermeable material, sometimes called "soilcrete". In the case of the advanced technology the jetted reagent material contains PRM's, and the mixture of soil and PRM (or, the replacement of loosened soil with PRM's) forms a permeable reactive barrier zone.

Traditionally, the jet grout injector is rotated during withdrawal (by rotating the drill string), creating a cylindrical column (typically in the vertical direction). On the other hand, if the jet grout drill string is not rotated during withdrawal, then the jet spray creates a relatively thin panel/wall section. Multiple columns or wall panels can be emplaced underground in an overlapping pattern to create a continuous barrier wall or zone.

Conventionally, three different generic types of jet grouting injector sub-assemblies are currently used for injecting neat cement grout i.e., one-fluid, two-fluid, and three-fluid designs. A one-fluid design has a single outlet nozzle that radially sprays a slurry mixture containing grout. A two-fluid design has two coaxial outlet nozzles, where the inner nozzle sprays the grout slurry and the outer nozzle sprays a conical aureole of compressed air, which serves to increase the radial distance of jet cutting action. A three-fluid design has three nozzles. Two of these nozzles are coaxial; with the inner nozzle injecting high-velocity water, and with the outer coaxial nozzle injecting a conical aureole of compressed air. The combined action of the water jet surrounded by the conical aureole of compressed air cuts and masticates the surrounding soil. The third nozzle, located some distance below the upper two coaxial nozzles, injects a relatively low-pressure slurry of grout into the already-masticated, loosened soil. In the two-fluid and three-fluid designs, the use of compressed air increases the radius of influence of the water jet. It also "lightens" the mixture of soil and water in the zone of influence of the jet, thus creating an airlift which pumps excess water and soil fines through the annular space between the borehole wall and the drill string to the surface. However, the single-fluid design is generally preferred for drilling inclined and horizontal holes.

For construction of permeable reactive barrier zones to depths greater than 40 feet, drilling operations use drill bits such as tri-cone, drag, and rock bits mounted on the end of a jet grouting nozzle sub-assembly ("sub" or "monitor"). Drilling bits use air or water or bentonite mud as a bit lubricant/cooling medium, which also serves as a carrier medium to bring cuttings up out of the hole during the drilling operation (i.e., spoils). Down-the-hole (DTH) hammer drill assemblies can also be used, which are driven by compressed air to provide a repetitive, percussive hammering force on the drill bit to increase drilling rates. The compressed air exits the DTHH drill assembly through passages in the attached drill bit, which expels rock cuttings from around the drill bit and flushes them away.

Downhole injection of PRM's mixed with liquid-based suspension agents results in multiple problems and concerns, which center around the practice of using jet grouting nozzles that were designed only for injecting neat cement/grout slurries.

Melegari, in U.S. Pat. No. 5,624,209, teaches that permeable reactive media made of dry aggregate particles can be suspended in a stream of air under relatively low pressure (approx. 20 bar), and then co-injected simultaneously with a separate spray of high-pressure water (approx. 500 bar) using a pair of coaxial radial nozzles, where the high-pressure water is injected through the inner nozzle, and the air/media spray being injected through the outer nozzle. The high-pressure/high-velocity (approx. 200–250 m/s) water jet disintegrates the soil and produces a mixing effect that disperses the injected dry media in the soil. The use of only low-pressure air to suspend the solid particles limits the ability of the device to inject the particulate matter deeply into the soil (in a radial direction).

Melagari explains in related U.S. Pat. No. 5,944,454 that the size of solid particles suspended in his air stream is preferably a few microns, and not more than 10 microns. For larger particles, such as steel granules having a size of several millimeters, Melagari teaches that it is not possible to obtain a stable and evenly distributed mixture of these millimeter-size solid substances in air at high pressure, nor is it possible to mix these solid particles with a high-pressure fluid (e.g., water) when the injection pressure is higher than 70–80 bar, due to the phenomena of "presso-filtration" that lead to the rising of compact layers inside the pipes that close the passage.

We have performed experiments using a coaxial nozzle geometry similar to Melegari's. Our tests revealed severe problems due to severe mechanical erosion of the internal passageways conveying the mixture of air+solid particles (i.e., the air/media stream). Excessive erosion was observed on both the inner and outer coaxial nozzles due to the abrasive action of the impinging solid particles, which ultimately lead to failure of the system. Also, clogging of narrow passages can occur if wet air (i.e., non-dry air) is used to suspend the particles.

Alternatively, Melagari teaches in U.S. Pat. No. 5,944,454 an apparatus for suspending the solid particles (e.g., having diameters 4–5 mm or more) in high density/high viscosity "gelatinized" water (water plus gelling agent, such as a high molecular weight organic polymer) and for co-injecting the suspended particles at low-pressure (50–100 bar) through the outer nozzle of a coaxial radial nozzle arrangement, simultaneously while injecting high-pressure water (300–600 bar) through the inner coaxial radial nozzle.

However, pumping of PRM's suspended in a viscous, high-density liquid requires time-consuming field operations, such as lengthy mixing procedures, to adequately combine and suspend the PRM in a liquid carrier (e.g., gelatinized water). Other problems with this method include: 1) pumping system internal wear caused by forcing abrasive PRM agents suspended in liquid through the pump internals; 2) continual hose and jet nozzle obstructions and clogging due to poorly mixed PRM with fluid suspension agents; 3) inability to accurately measure injected volume of PRM reagent; 4) inadvertent introduction of exogenous bacterial food supply with subsequent bacteriologic contamination of groundwater from organic suspension agents (e.g., guar gum, gelatinized water, etc.); 5) inability to accurately measure total liquid volumes injected, since pumps, hoses, pipes, and drill pipe retain large unaccounted volumes; and 6) excessive spoils return to the surface via the drill string hole annulus (sometimes as high as 70% spoils returns), which results in unwanted transport of contaminated soil to the surface, and in recycling PRM back to the surface, rather than treating the contaminants of concern in-situ.

Alternatively, Melegari teaches in U.S. Pat. No. 6,050,337 a jet grout injector sub-assembly that has three or more radial nozzles stacked axially (i.e., vertically) along the drill string. The first nozzle (located at the highest level on the sub-assembly) injects a high-pressure fluid (e.g., water at 600 bars and more) to break the soil with a high-velocity jet (e.g., 300–350 m/s). The second nozzle (the one in the middle) injects particulate material at a low pressure. The third nozzle (the one on the bottom) injects high-pressure water to mix the injected particulate media with the ground broken up by the first nozzle.

Melegari continues to teach in U.S. Pat. No. 6,050,337 a treatment method where the high-pressure fluid is first injected by the top nozzle; then the particulate material is injected at low pressure through the middle nozzle; followed sequentially by injecting the high pressure fluid to mix the injected material with the broken soil through the bottom nozzle.

However, the distances between adjacent nozzles in Melegari's triple nozzle design are so large that essentially no interaction can occur between adjacent jets/sprays. In other words, the action of each jet/spray at a given depth in the soil occurs independently of the other one (i.e., each jet/spray passes by the given location/height sequentially one-at-a-time as the drill string is withdrawn). One problem with the large spacing between nozzles taught by Melegari is that masticated soil broken by the uppermost high-pressure water nozzle can interfere with, and limit, the dispersing power of the middle nozzle. Additionally, the bottom (water spray) nozzle is spaced so far down below the middle (media injection) nozzle that no synergistic effect can occur between the middle and bottom nozzles that would lead to a greater radial distance of mixing (as is well-known in conventional two-fluid jet grouting systems that use a conical aureole of compressed air coaxially surrounding an inner high-pressure jet spray of grout to increase the radial distance of grout deposition by roughly a factor of two as compared to a single-fluid system that doesn't use an aureole of compressed air).

For some drilling applications, a Down-the-Hole (DTH) hammer drill assembly is used, for example, to increase drilling rates. The DTHH drill assembly uses compressed air to provide a repetitive, percussive hammering force onto the drill bit. This requires an independent supply of compressed air. The use of a coaxial pipe string, such as taught by Melegari, supra, cannot provide a third independent supply of compressed air, while simultaneously supplying the two different fluids described above (i.e., for cutting/mixing with a water jet, and for injecting solid particles suspended in air or gelatinized water).

A need remains, therefore, for a simple, readily deployable, and long-lasting solution to the problem of efficiently injecting permeable reactive media (PRM) to form permeable reactive barriers (PRB's) having a large radial depth of penetration, a uniform and homogenous distribution of PRM, an engineered permeability and hydraulic conductivity, etc., while minimizing problems with excessive return of spoils to the surface, and while eliminating problems due to bacterial contamination and clogging of the treated subsurface volume caused by the use of organic liquid-based suspension agents. A need also exists for a media injector sub-assembly that can accommodate three independent fluid/gas streams (e.g., compressed air, high-pressure water, and particulate media suspended in a carrier gas or liquid) for use with a DTH hammer drilling assembly.

Against this background, the present invention was developed.

SUMMARY OF THE INVENTION

The present invention relates to an improved method and apparatus for injecting particulate media into the ground for constructing underground permeable reactive barriers, which are used for environmental remediation of subsurface contaminated soil and water. A media injector sub-assembly can be attached to a triple wall drill string pipe, which sprays a mixture of active particulate media suspended in a carrier fluid radially outwards from the sub-assembly, at the same time that a mixing fluid is sprayed radially outwards. The media spray intersects the mixing spray at a relatively close distance from the point of injection, which entrains the particulate media into the mixing spray and ensures a uniform and deep dispersion of the active media in the surrounding soil. The media injector sub-assembly can optionally include channels for supplying compressed air to an attached down-the-hole hammer drive assembly for use during drilling.

BRIEF DESCRIPTION OF THE DRAWINGS

The accompanying drawings, which are incorporated in and form part of the specification, illustrate various examples of the present invention and, together with the detailed description, serve to explain the principles of the invention.

DETAILED DESCRIPTION OF THE INVENTION

The word "soil" is defined herein to include soil, sand, clay, gravel, aggregates, organic materials, other granular materials, either naturally occurring or man-made, which can be loosened and eroded by the action of a fluid spray. The phrase "jet grouting" is broadly defined to include injection of slurries containing (1) grout or other ground-hardening and relatively impermeable materials; and/or (2) permeable reactive media (PRM). The words "slurry" and "grout" are defined herein to include any mix or mixtures of solid materials with any liquid, including water; and with any gases, including air. The words "slurry" and "grout" also comprehends 0% of solid materials, including: (1) injection of only liquids; (2) liquids plus gases; (3) gases only; (4) or any combination of solids, gases, and liquid that can be injected from a spray nozzle, i.e., "jet grouted". The words "slurry" and 'grout' are used interchangeably, as defined above. The word "fluid", unless otherwise modified, means a liquid, gas, mixture of gas plus liquid, mixture of gas plus solid particles, a mixture of liquid plus solid particles, or a mixture of gas and liquid plus solid particles. The word "media", unless otherwise modified, includes solid particles of a permeable reactive media (PRM) The terms "media" and "particulate media" are used interchangeably herein.

Figure 1:
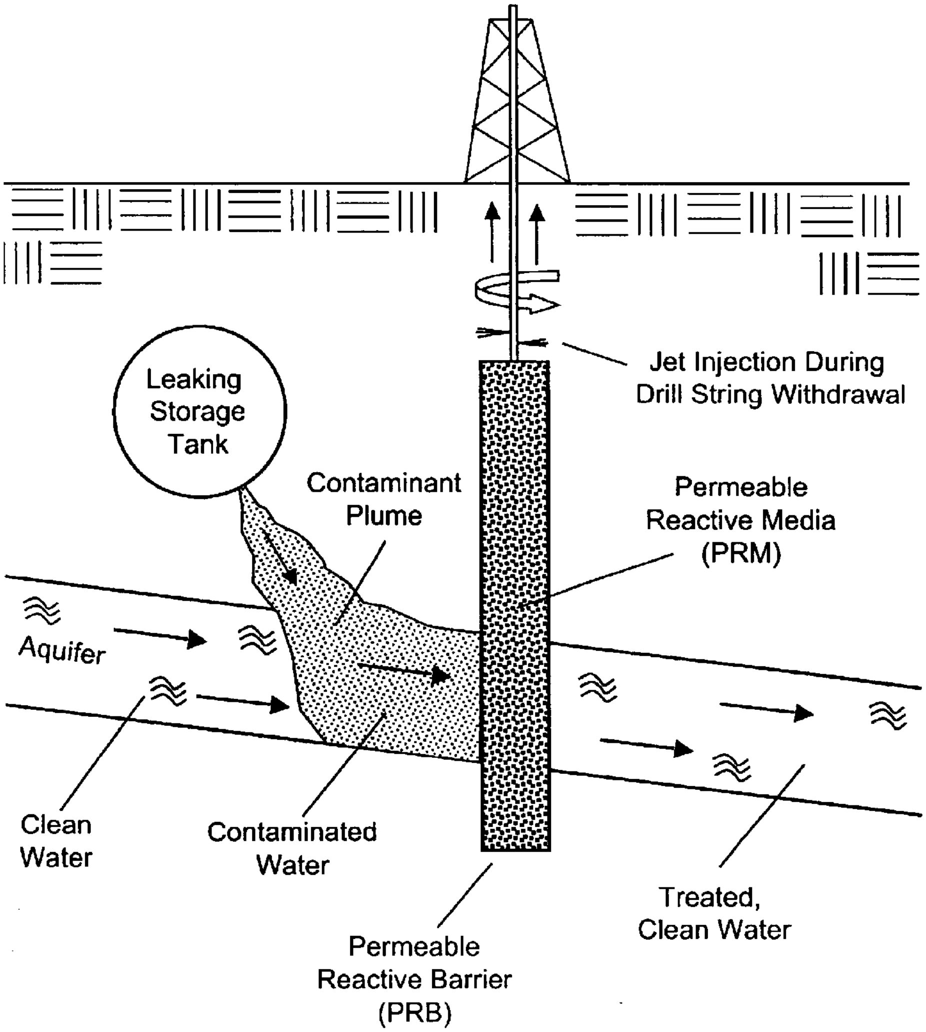
FIG. 1 illustrates a schematic elevation view of an application of constructing a permeable reactive barrier using jet injection during drill string withdrawal, where the permeable reactive barrier is placed in the path of a contaminant plume and remediates the contaminated water that passes through the permeable reactive barrier by using permeable reactive media.
Figure 2:
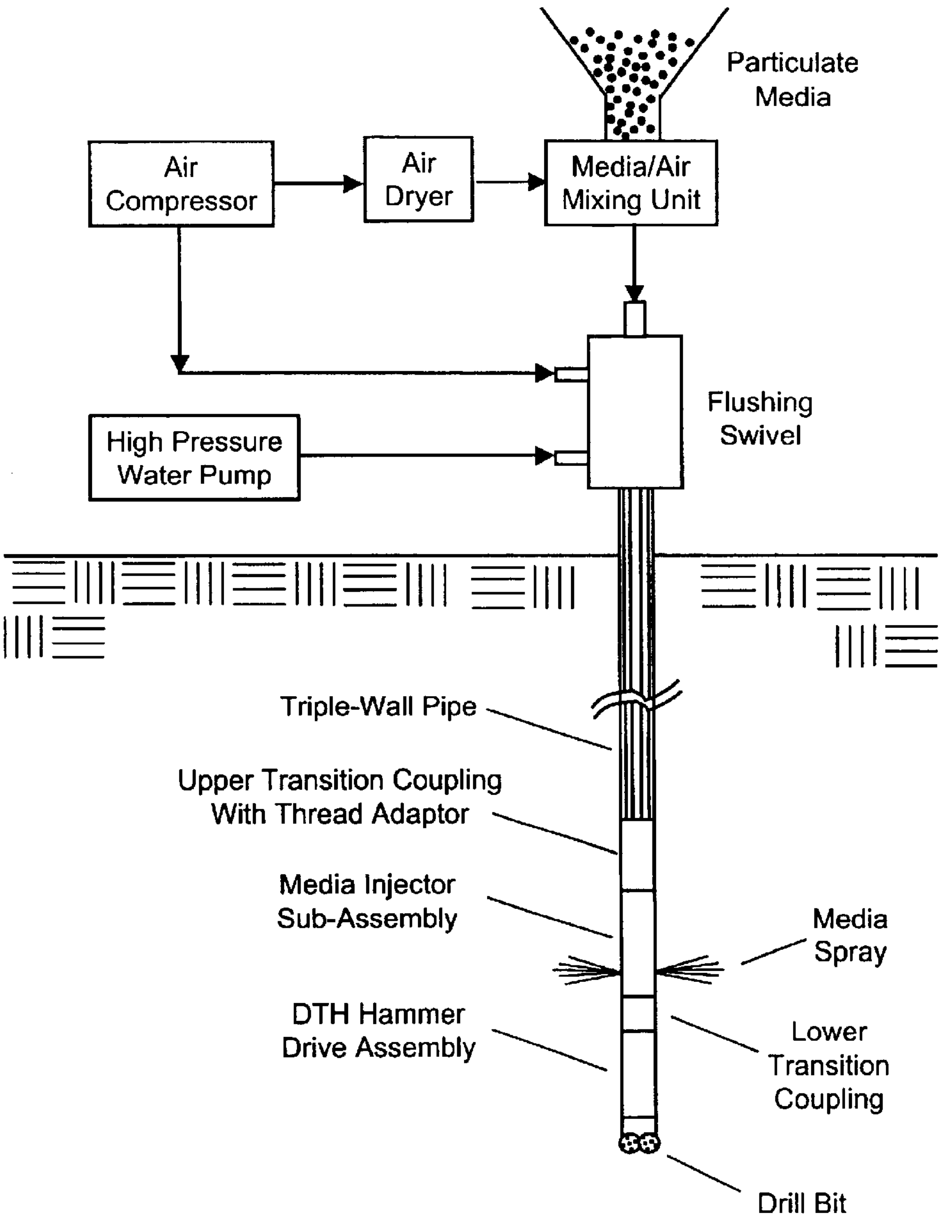
FIG. 2 illustrates a schematic elevation view of an example of a system for injecting particulate media underground, according to the present invention.

FIG. 2 illustrates a schematic elevation view of an example of a system for injecting particulate media underground, according to the present invention. Above ground, an air compressor supplies air to an air dryer, which removes water from the air. The dried air is supplied to a Media/Air Mixing Unit, which mixes particulate media (e.g., PRM) with the dried air. The mixture of air-plus-media is then supplied to a flushing swivel attached to a concentric, triple-wall pipe above ground at the upper end of a downhole drill string. The flushing swivel allows the pipe to rotate during drilling or jet injection while supplying fluids to the pipe. The air compressor also supplies an independent supply of compressed air to the flushing swivel. A high-pressure water pump supplies pressurized water to the flushing swivel. The three fluids travel down the drill string through three concentric plenum spaces in-between the three walls of the triple-wall pipe, through a thread adaptor, through an upper transition coupling, and into a media injector sub-assembly. The mixture of media-plus-air is sprayed radially outwards from the drill string, thereby injecting the particulate media into the surrounding soil. The high-pressure water can be used to spray one or more high-velocity jets of water radially outwards, for cutting and masticating the surrounding soil, and for mixing the injected media with the masticated soil. A down-the-hole hammer drive assembly can be attached to a lower transition coupling, which is attached to the lower end of the media injector sub-assembly. A down-the-hole hammer drive assembly can applies a percussive force to the drill bit during drilling.

Figure 3:
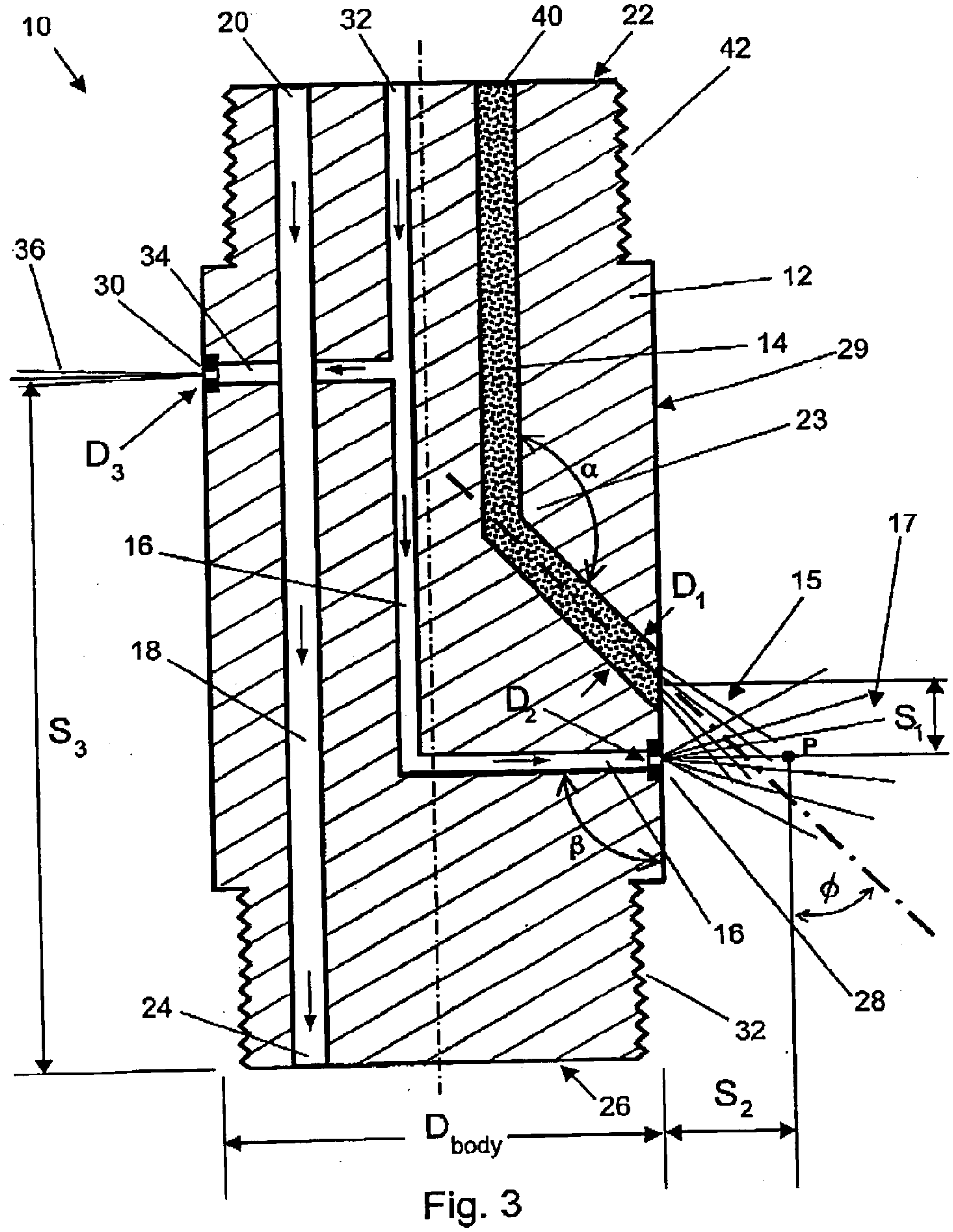
FIG. 3 shows a schematic elevation cross-section view of a first embodiment of a media injector sub-assembly, according to the present invention

FIG. 3 shows a schematic elevation cross-section view of a first embodiment of a media injector sub-assembly, according to the present invention. Sub-assembly 10 comprises a cylindrical body 12 with a proximal (upper) end 22, a distal (lower) end 26, an upper threaded stub 42 for joining body 12 to an upper transition coupling (not shown), a lower threaded stub 32 for joining body 12 to an lower transition coupling (not shown). Body 12 additionally comprises at least three independent fluid passageways (i.e., internal channels) for conveying fluids of different types. Media supply channel 14 carries a mixture of particulate media (i.e., PRM) suspended in a carrier fluid (e.g., air) from entrance 40, through body 12, and exiting as media spray 15. Channel 14 has a diameter $D_1$. The centerline of media supply channel 14 is oriented at an angle, ø, with respect to vertical axis of body 12. The example illustrated in FIG. 3 shows an angle of inclination, ø, equal to approximately 45°. However, ø can be chosen to be within the range from greater than zero degrees to less than 180 degrees. Alternatively, ø can be chosen to be within the range from greater than 30 degrees to less than 60 degrees. Alternatively, ø can be chosen to be within the range from greater than 40 degrees to less than 50 degrees. Optionally, a spray nozzle insert with a reducing orifice (not shown) could be added at or near the exit of media supply channel 14; this can be used to reduce the initial diameter of media spray 15, thereby increasing its exit velocity.

FIG. 3 shows an example where the upper portion of media supply channel 14 is oriented parallel to the vertical axis of body 12, and the lower (exit) portion of media supply channel 14 is oriented at an angle, ø, with respect to the vertical (axial) direction. Send 23 has an internal bend angle, $\alpha$ (e.g., in FIG. 3, $\alpha$=120°). Note that this example assumes the media injector subassembly is oriented vertically, as it would be used in a vertical drill hole. However, other angles of inclination of the drill hole (and, hence the sub-assembly) can be used and are contemplated by the present invention, including, horizontal drilling. Unlike the second fluid channel 16, which makes a 90° right angle bend (i.e. $\beta$=90°), the use of a shallower bend angle in media supply channel 14 reduces potential problems with material erosion due to impact of potentially abrasive solid particles, particularly at bend 23. In general, the smoother the bend in media supply channel 14, the less problem there will be with wall erosion (if any). In some embodiments, channel 14 may have no bonds with a bend angle $\alpha$ less than 120 degrees. Optionally, the interior surface of media supply channel 14 can be treated with a hard-face coating (e.g., ceramic) or subjected to a surface conversion technique (e.g., nitriding, anodizaton) to increase the hardness of the wall to further minimize problems with internal erosion.

Referring still to FIG. 3, body 12 further comprises second fluid supply channel 16, which carries a fluid (e.g., high-pressure water) from entrance 32 through body 12, and exiting as mixing spray 17. Mixing spray nozzle 28 (illustrated, for example, as a disk with an orifice) is located at the exit of mixing fluid channel 16, and has an exit diameter $D_2$ that defines the initial diameter of mixing spray 17. The orientation of the centerline of mixing spray 17 is illustrated as being horizontal (i.e., radially outwards from the center of cylindrical body 12, and perpendicular to the vertical axis of body 12), however, other angles of orientation (as defined with respect to the vertical axis of body 12) can optionally be used, ranging from greater than zero degrees to less than 180 degrees (see FIGS. 14A, 14B). Mixing spray nozzle 28 can be located downstream (i.e., below) the location where media spray 15 exits body 12. Optionally (not shown), mixing spray nozzle 28 can be located adjacent (i.e., to the side of) the location where media spray 15 exits body 12 (i.e., at the same elevation). Mixing spray nozzle 28 can be designed, using methods well-known in the art, to generate a thin, pencil-like jet spray; or a wide fan-like conical spray or an elliptically-shaped spray; or any shape in-between these. Mixing spray nozzle 28 can have more than one exit orifice, to generate multiple sprays (e.g., four sprays from four exit orifices), in a multitude of patterns (e.g., diamond, square, flat line, etc.), as illustrated in FIGS. 15A, 15B, and 15C.

Continuing, FIG. 3 shows an optional cutting spray nozzle 30 (illustrated, for example, as a disk with an orifice) located at the exit of a side channel 34 that splits off from second fluid channel 16. Cutting spray nozzle 30 has an exit diameter $D_3$ that defines the initial diameter of cutting spray 36, which sprays radially outwards from body 12 at a location that can be upstream (i.e., above) the location of mixing spray 17, and that can be upstream (i.e., above) the location of media spray 15. Optional cutting spray 36 (e.g., high-pressure water) can be used to cut and masticate the soil surrounding sub-assembly 10. Then, when media injector sub-assembly 10 is being withdrawn, particulate media can be injected via media spray 15 into already-masticated, broken-up soil, which allows for a greater depth of penetration and a more uniform dispersion of the injected particulate media. The orifice diameter $D_3$ of cutting spray 36 can be the same as, or different than, the orifice diameter $D_2$ of mixing spray 17. If the orifice diameter $D_3$ of cutting spray 36 is less than the orifice diameter $D_2$ of mixing spray 17, then the velocity of cutting spray 36 (and, hence, cutting depth), will be greater than the velocity (and, hence, mixing depth), of mixing spray 17. The centerline of cutting spray 36 is illustrated as being horizontal in FIG. 3, however, any other orientation could be used from greater than zero degrees to less than 180 degrees. In FIG. 3, spray 36 exits at a position that is located on the opposite side of body 12 than the media and mixing sprays. However, other angular positions that are not located on the opposite side of body 12 may be used, and more than one cutting spray 36 may be used.

In FIG. 3, a third fluid channel 18 carries an independent stream of working fluid (e.g., air, water, hydraulic fluid, mud) from entrance 20 at the proximal end 22 of body 12, through body 12, to exit 24 at the distal end 26 of body 12. The working fluid carried in channel 18 can be, for example, compressed air; which can be used to drive (i.e., actuate) a down-the-hole hammer drive assembly (not shown) attached to the distal end of body 12.

Referring still to FIG. 3, the respective centerlines of media spray 15 and mixing spray 17 intersect at a point labeled "P", which is located at a radial (e.g., horizontal) distance, $S_2$, outwards from the outer surface 29 of body 12. Optionally, the radial distance, $S_2$, can be less than or equal to 5 times the exit diameter, $D_1$, of media supply channel 14. Alternatively, the radial distance, $S_2$, can be less than or equal to the outside diameter, $D_{body}$, of cylindrical body 12. As can be seen in the example illustrated in FIG. 3, $S_2$ is approximately equal to about 3 times $D_1$.

The respective centerlines of media spray 15 and mixing spray 17 are separated in the vertical (axial) direction by an axial separation distance, $S_1$. Optionally, axial separation distance $S_1$ can be less than or equal to the outside diameter, $D_{body}$, of cylindrical body 12. Alternatively, separation distance $S_1$ can optionally be less than or equal to 4 times the exit diameter, $D_1$, of media supply channel 14. As can be seen in the example illustrated in FIG. 3, $S_1$ is approximately equal to about 1.5 times $D_1$. The closer the starting point of media spray 15 is to the starting point of mixing spray 17 (i.e., by minimizing the separation distances $S_1$ and $S_2$), the greater the probability is that a given particle of PRM) will be entrained into the mixing spray 17.

By properly choosing the orientation angles, separation distances, and fan spray angles of both the media spray 15 and mixing spray 17, most of the particulate media carried by media spray 15 can be entrained into the bulk of mixing spray 17, which allows for a more uniform dispersion of particulate media (e.g., PRM) into the surrounding soil during remediation operations (i.e., during withdrawal of media injector sub-assembly 10).

Mixing spray 17 can achieve a greater radial depth of penetration into the surrounding soil by using high-pressure water (e.g., 30–600 bar) and a small exit orifice diameter (e.g., 1–4 mm) to generate mixing spray 17. This is in contrast to the relatively shallow depth of penetration of particulate media obtained by using a relatively low air pressure in media supply channel 14, and a larger exit diameter. However, the greater depth of penetration for mixing spray 17 afforded by a shallow fan angle (i.e., thin, pencil-like jet spray) may not entrain as much particulate media as would be obtained by using a wider (greater fan angle) mixing spray 17, with lower velocity. Likewise, if the penetration depth of media spray 15 is shallow, and the separation distance, $S_1$, is too large, there may not be any interaction between media spray 15 and mixing spray 17. Without any interaction between sprays, the degree of mixing and dispersion of media will likely be poor. On the other hand, if the fan angle of mixing spray 17 is quite large, then the depth of penetration of mixing spray 17 will be shallow, despite the fact that a large fraction of particles from media spray 15 will likely be entrained into mixing spray 17. In this case, media dispersion might be quite uniform, but limited to a shallow depth.

Hence, the degree of particle entrainment, degree of mixing, and the depth of penetration of mixing spray 17 may be competing variables that are likely affected by the separation distances and fan angles of the media and mixing sprays, as well as fluid pressure, viscosity, temperature, particle size, particle density, nozzle design, and other variables, such as soil properties, soil homogeneity, etc. Also, the degree of particulate media dispersion and depth may likely depend on the speed of drill string withdrawal and the rate of drill string rotation.

Media spray 15 can comprise one or more different types of particulate media suspended in a carrier medium, which can be air, dry air, other gases (oxygen, nitrogen, etc.), a liquid, water, gelled water, guar, water with viscosifying agents, or combinations thereof. Examples of reactive particulate media will be provided later. Mixing spray 17 can comprise, for example, water, water at high-pressure (e.g., from 30–600 bars), water with added chemicals (e.g., pH-modifying chemicals, surfactants, etc.), salt-water, compressed air, steam, other gases (oxygen, nitrogen), and combinations thereof.

The outside diameter of the media injector sub-assembly (i.e., $D_{body}$) can range from 3" inches to 12 inches. Alternatively, $D_{body}$ can be approximately 3.5 inches. The orifice diameter of the media spray can be from 0.3 to 0.7 inches, or, alternatively, can be about 0.5 inches. The orifice diameter of the mixing spray can be from 1 mm to 4 mm, or, alternatively, can be from 1.5 mm to 3.5 mm. The working pressure of the air+media fluid stream can be from 100 to 350 psi. The flow rate of high-pressure water can be from 50 l/min to 150 l/min, and the flow rate of particulate media can be from 50 to 150 lbs/min.

Figure 4A:
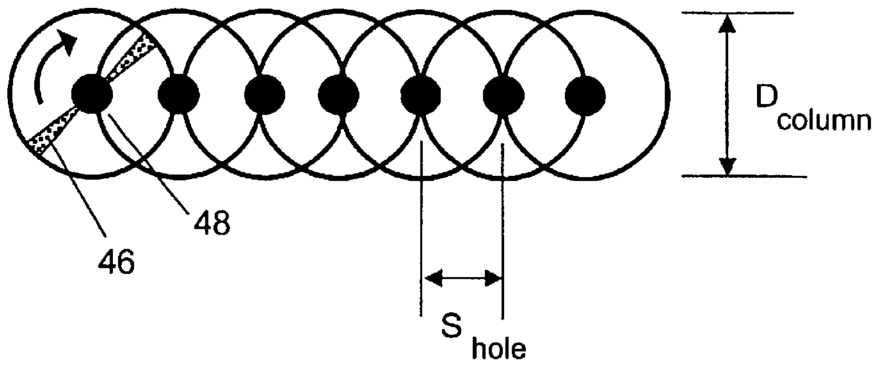
FIG. 4A shows a plan view of an example of a permeable reactive barrier, according to the present invention.

FIG. 4A shows a plan view of an example of a permeable reactive barrier, according to the present invention. Here, a series of holes have been drilled, separated by a fixed distance, $S_{hole}$. Media injector sub-assembly 48 has been inserted into each hole. During withdrawal, particulate media 46 is sprayed radially outwards while the sub-assembly is rotated, creating a cylindrical column with diameter $D_{column}$ containing permeable reactive material. When $S_{hole}$ is less than $D_{column}$, then adjacent columns can overlap and form a relatively continuous reactive barrier wall.

Figure 4B:
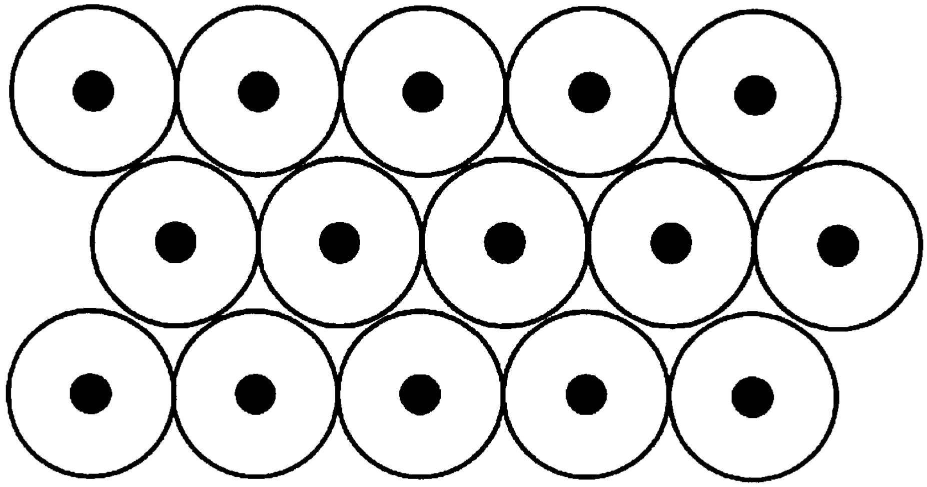
FIG. 4B shows a plan view of another example of a segment of permeable reactive barrier, according to the present invention.

FIG. 4B shows a plan view of another example of a segment of permeable reactive barrier, according to the present invention. Here, a thick, continuous reactive barrier wall is formed from multiple rows of columns.

Figure 4C:
FIG. 4C shows a plan view of another example of a segment of permeable reactive barrier, according to the present invention.

FIG. 4C shows a plan view of another example of a segment of permeable reactive barrier, according to the present invention. Here, the media injector sub-assembly (with dual media spray nozzles on opposite sides) attached to the drill string is not rotated during drill string withdrawal, creating a "bow-tie" shaped spray pattern. Multiple "bow-ties" can be formed adjacent to one another, creating a relatively thin, flat reactive barrier wall.

Figure 4D:
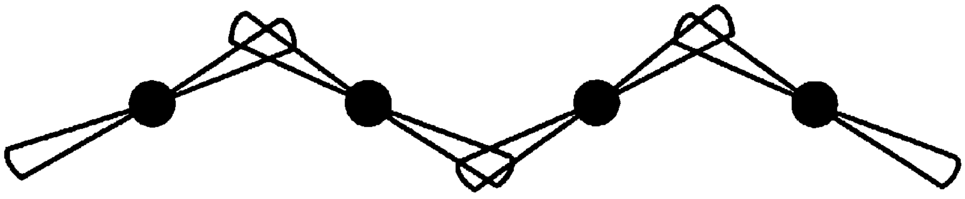
FIG. 4D shows a plan view of another example of a segment of permeable reactive barrier, according to the present invention.

FIG. 4D shows a plan view of another example of a segment of permeable reactive barrier, according to the present invention. Here, the media injector sub-assembly (with dual media spray nozzles on opposite sides) attached to the drill string is not rotated during drill string withdrawal, creating a "bow-tie" shaped spray pattern. Multiple "bow-ties" can be formed adjacent to one another, creating a relatively thin, flat reactive barrier wall. However, in this example, the orientation of each bow tie has been alternately angled back-and-forth to form a zigzag pattern that helps to insure continuity of deposited media by using intersecting spray patterns.

Figure 5:
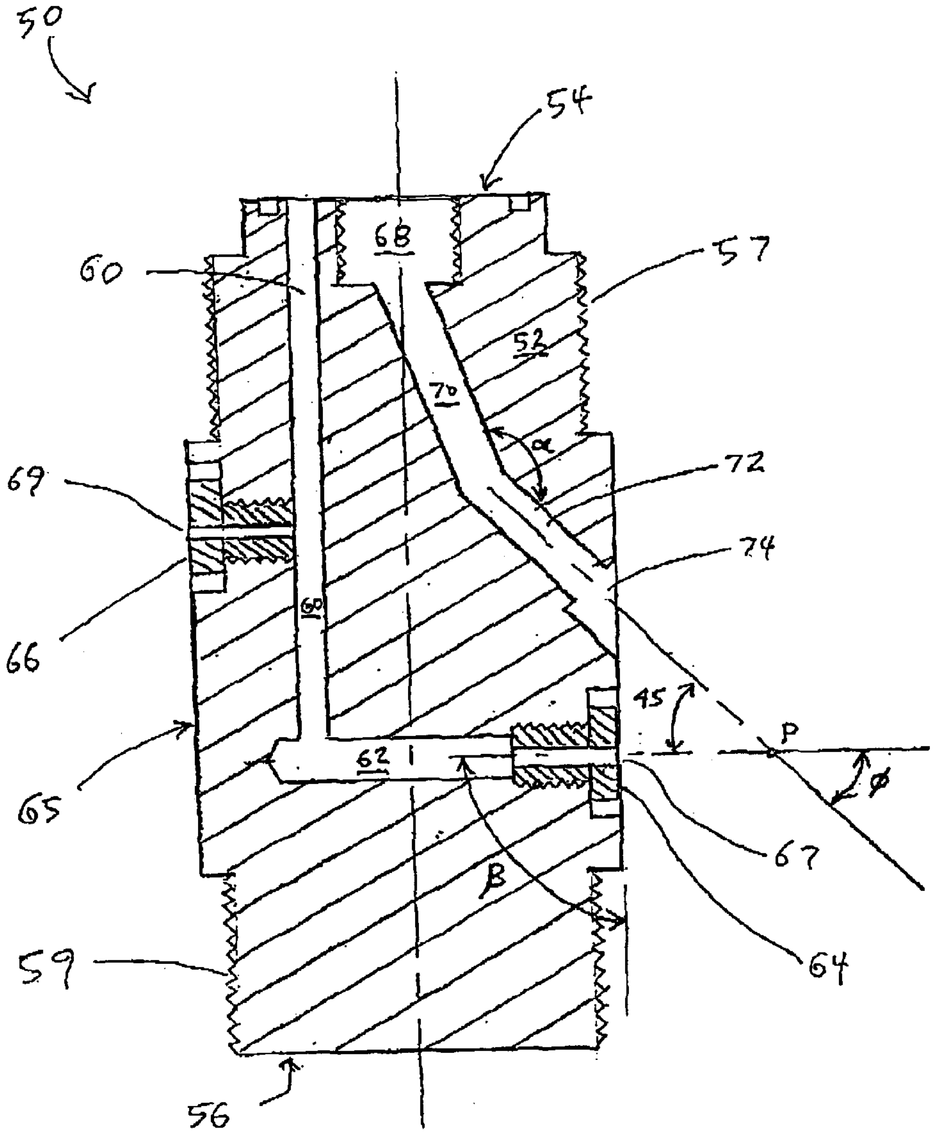
FIG. 5 shows a cross-section view of a second embodiment of a media injector sub-assembly, according to the present invention.

FIG. 5 shows a cross-section view of a second embodiment of a media injector sub-assembly, according to the present invention. Sub-assembly 50 comprises a cylindrical body 52 with a proximal (upper) end 54, a distal (lower) end 56, an upper threaded stub 57 for joining body 52 to an upper transition coupling (not shown), a lower threaded stub 59 for joining body 52 to an lower transition coupling (not shown). Body 52 additionally comprises at least three fluid passageways (i.e., internal channels) for conveying fluids of different types (note, only two different fluid channels show up in this view). Media supply channel 70/72/74 carries a mixture of particulate media (i.e., PRM) suspended in a carrier fluid (e.g., air) from entrance plenum 68, through body 52, and exiting as a media spray. Second fluid supply channel 60 and 62 carries water (or other mixing fluid) to mixing fluid nozzle insert 64, which sprays the fluid through orifice 67. Optionally, a cutting nozzle insert 66 with orifice 69 can be used, which is supplied by second fluid supply channel 60. Nozzle inserts 64 and 66 can be replaceable/removable components.

Figure 6:
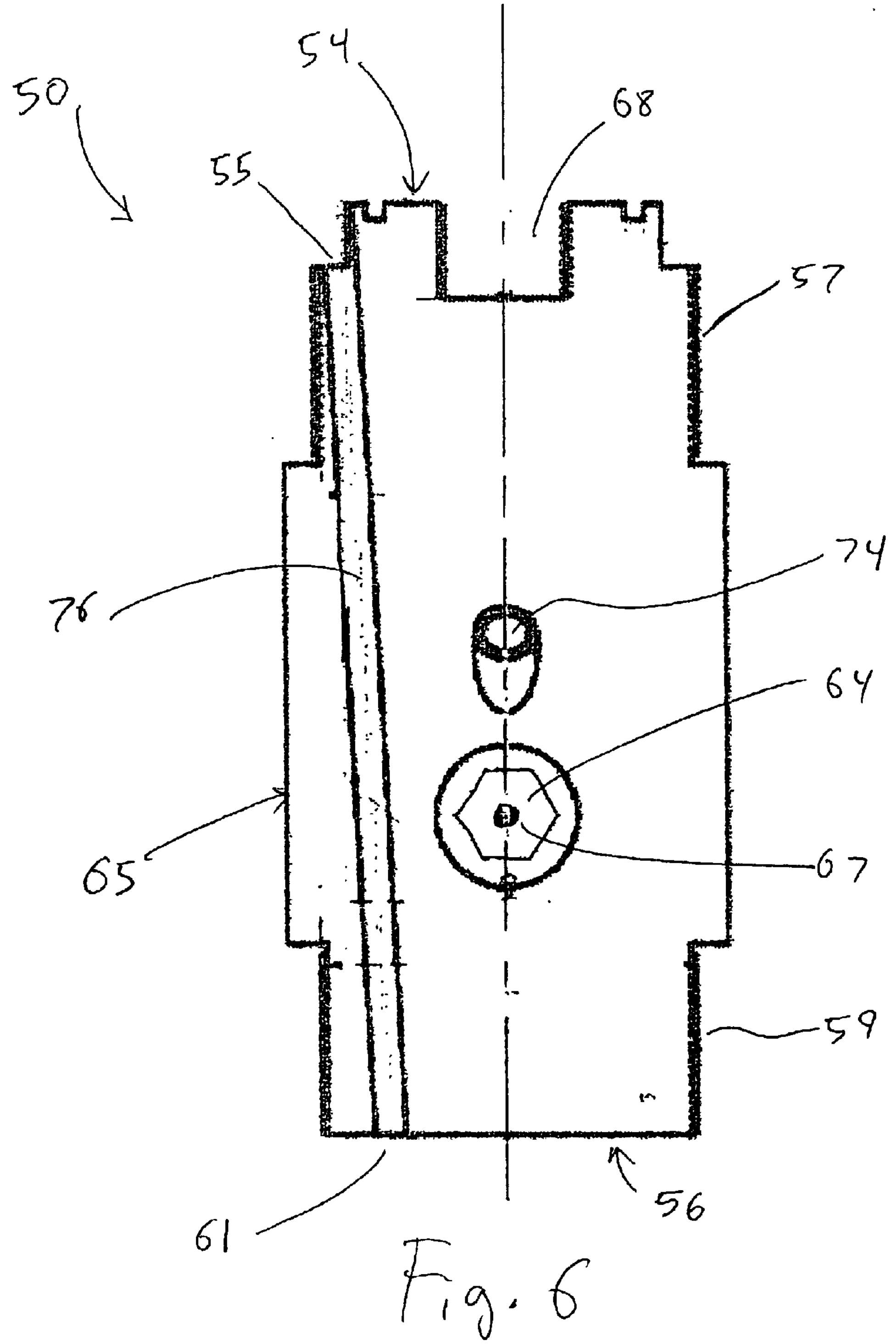
FIG. 6 shows a different cross-section view of the second embodiment of a media injector sub-assembly, according to the present invention, where the cross-section has been taken through a plane that is perpendicular to the cross-section plane shown in FIG. 5.

FIG. 6 shows a different cross-section view of the second embodiment of a media injector sub-assembly, according to the present invention, where the cross-section has been taken through a plane that is perpendicular to the cross-section plane shown in FIG. 5. In this view, a third fluid supply channel 76 can be seen, which enters at entrance 55 at the proximal end 54 of body 52, and exits at exit 61 at the distal end 56 of body 52. Third fluid supply channel 76 can carry compressed air, hydraulic fluid, water, or other working fluid to an attached down-the-hole hammer drive assembly (not shown). Channel 76 is tilted at a small inclined angle with respect to the vertical axis of body 52. Channel 76 can comprise a plurality of similar channels arranged around the circumference of body 52, to provide greater total cross-sectional area for flowing the third fluid (e.g., compressed air). Exit nozzle 74 for spraying particulate media can be seen, as well as removable mixing nozzle insert 64 with orifice 67.

Figure 7:
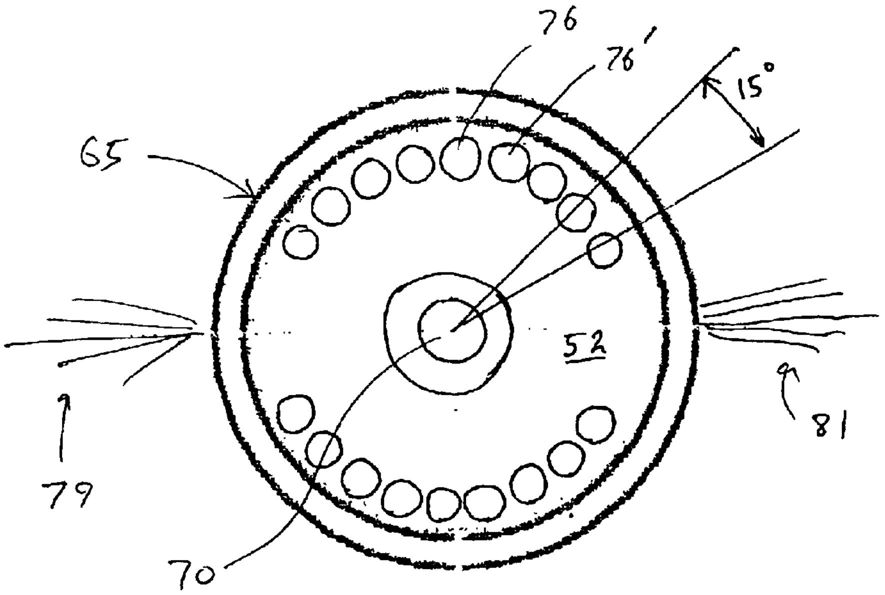
FIG. 7 shows a side view of the proximal end 54 of the second embodiment of a media injector sub-assembly, according to the present invention.

FIG. 7 shows a side view of the proximal end 54 of the second embodiment of a media injector sub-assembly, according to the present invention. A plurality of third fluid channels 76, 76', etc. are arranged in a circular pattern around the outer circumference of body 52, with nine channels in the upper half and nine channels in the lower half, separated by 15 degrees in the circumferential direction. Media fluid channel 70 can be seen in the center. Second fluid channel 60 is not shown. Mixing fluid spray 79 and optional cutting spray 81 can be seen, located on opposite sides of body 52 (i.e., 180 degrees apart).

Figure 8:
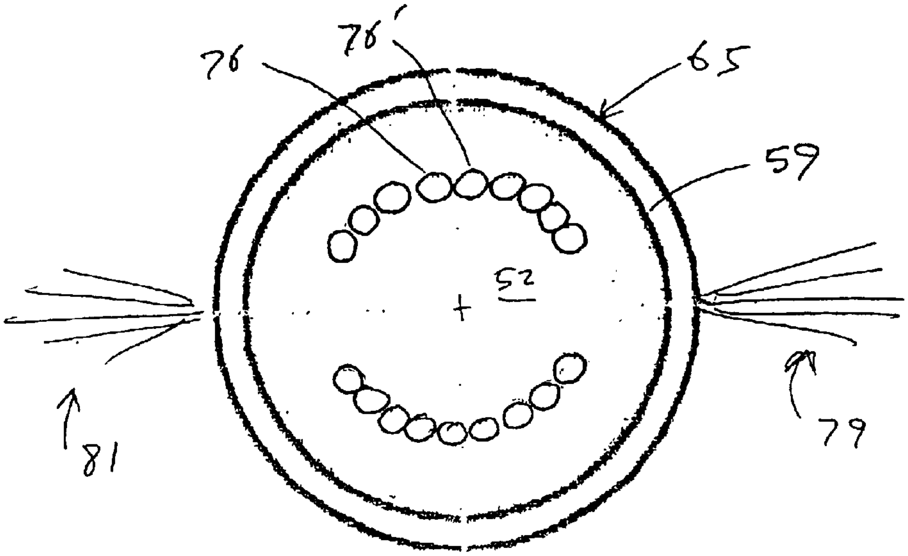
FIG. 8 shows a side view of the distal end 56 of the second embodiment of a media injector sub-assembly, according to the present invention.

FIG. 8 shows a side view of the distal end 56 of the second embodiment of a media injector sub-assembly, according to the present invention. The plurality of third fluid channels 76, 76', etc. are arranged in a smaller-diameter circular pattern around the outer circumference of body 52, with nine channels in the upper half and nine channels in the lower half, separated by 15 degrees in the circumferential direction. Mixing fluid spray 79 and optional cutting spray 81 can be seen, located on opposite sides of body 52 (i.e., 180 degrees apart).

Figure 9:
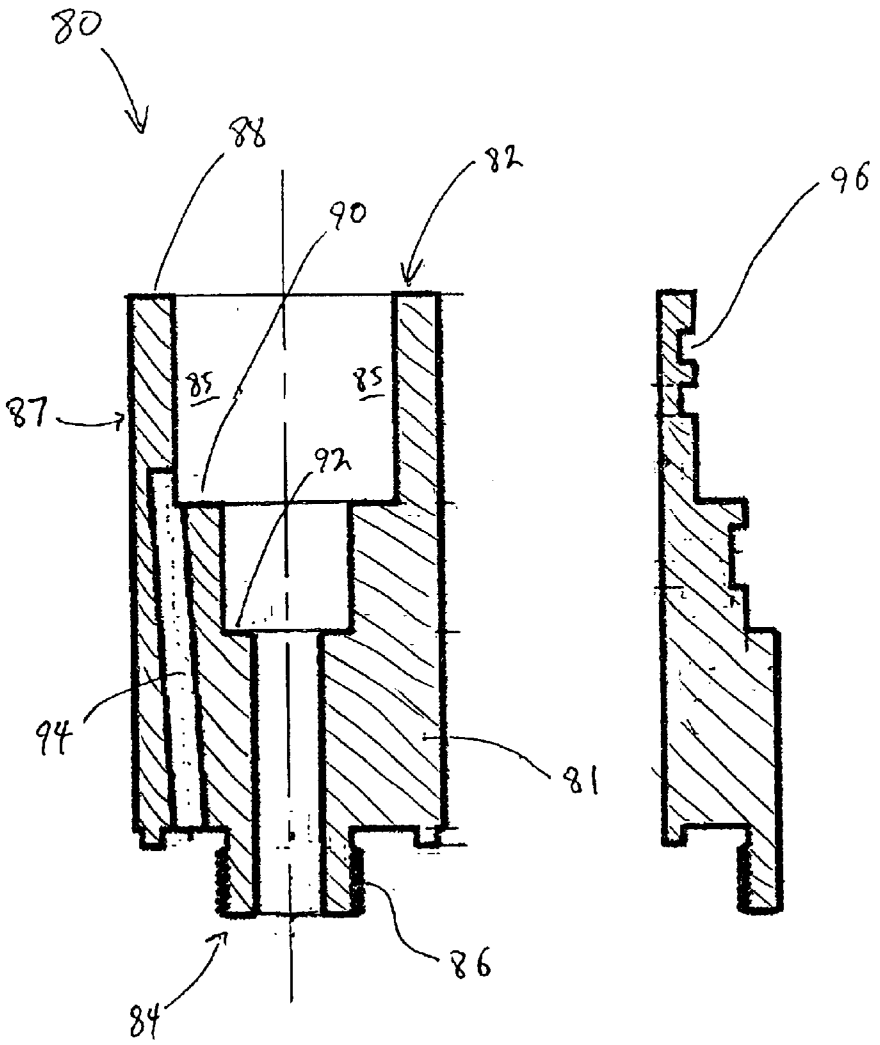
FIG. 9 shows a cross-section elevation view of an example of an upper transition coupling, according to the present invention.

FIG. 9 shows a cross-section elevation view of an example of an upper transition coupling, according to the present invention. Upper coupling 80 comprises a cylindrical body 81 with a proximal (upstream) end 82 and a distal (downstream) end 84. Annular surfaces 88 and 92 receive the mating ends of a triple-wall pipe (not shown). Internal channel 94 (one of three) carries mixing (and/or cutting) fluid from an annular plenum 85 defined on one side by annular surface 90, from the proximal end 82 to the distal end 84. FIG. 9 also shows a cross-section elevation view of sealing details of upper transition coupling 80, according to the present invention. The seals, held in grooves 96 (typ.), can be made of an elastomeric material, e.g., polyurethane. A double-seal design can be used, as illustrated in FIG. 9.

Figure 10:
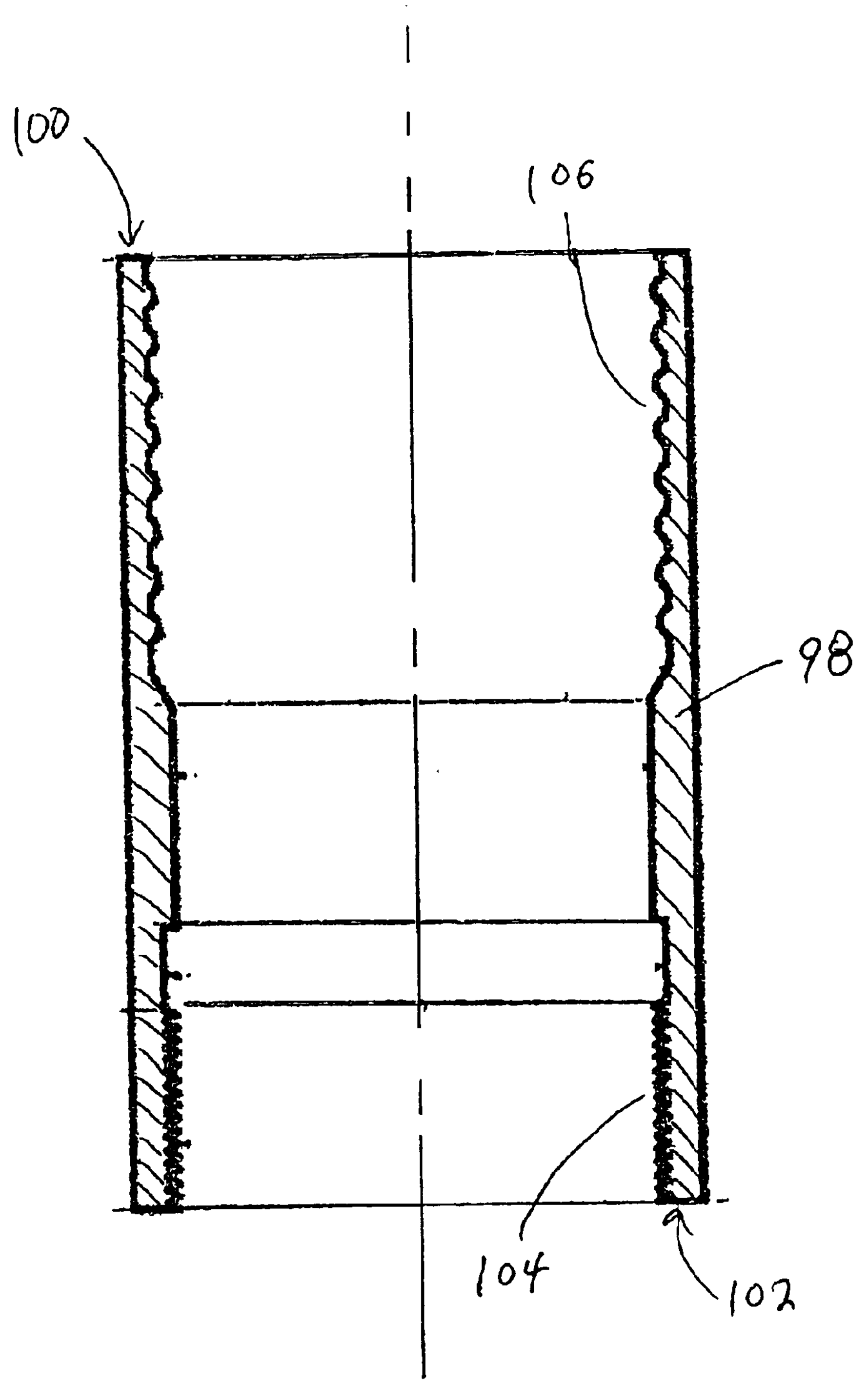
FIG. 10 shows a cross-section elevation view of an example of a thread adaptor, according to the present invention.

FIG. 10 shows a cross-section elevation view of an example of a thread adaptor, according to the present invention. Thread adaptor 98 comprises a hollow cylindrical body with fine internal threads 104 at the distal (downstream) end 102 for coupling to upper threads 57 on the proximal end of media injector sub-assembly 50 (see FIG. 5). Thread adaptor 98 also comprises coarse internal threads 106 at the proximal (upstream) end 100 for coupling to a triple-wall drill string pipe (not shown, see FIG. 2).

Figure 11:
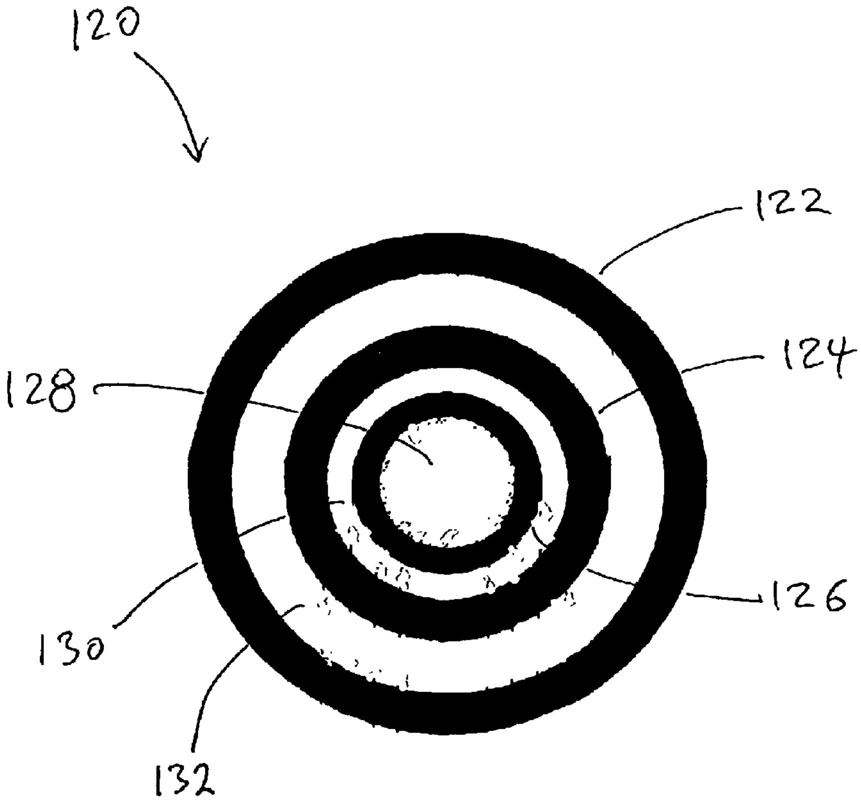
FIG. 11 shows a cross-section elevation view of an example of a triple-wall drill string pipe, according to the present invention.

FIG. 11 shows a cross-section elevation view of an example of a triple-wall drill string pipe, according to the present invention. Triple-wall pipe 120 comprises three concentric walls, 122, 124, and 126. Inner volume 128 inside of internal wall 126 can carry the mixture of particulate media suspended in a carrier fluid. Middle volume 130 located in-between walls 126 and 124 can carry mixing/cutting fluid (e.g., high-pressure water). Outside volume 132 located in-between walls 124 and 122 can carry a third working fluid (e.g., compressed air).

Figure 12:
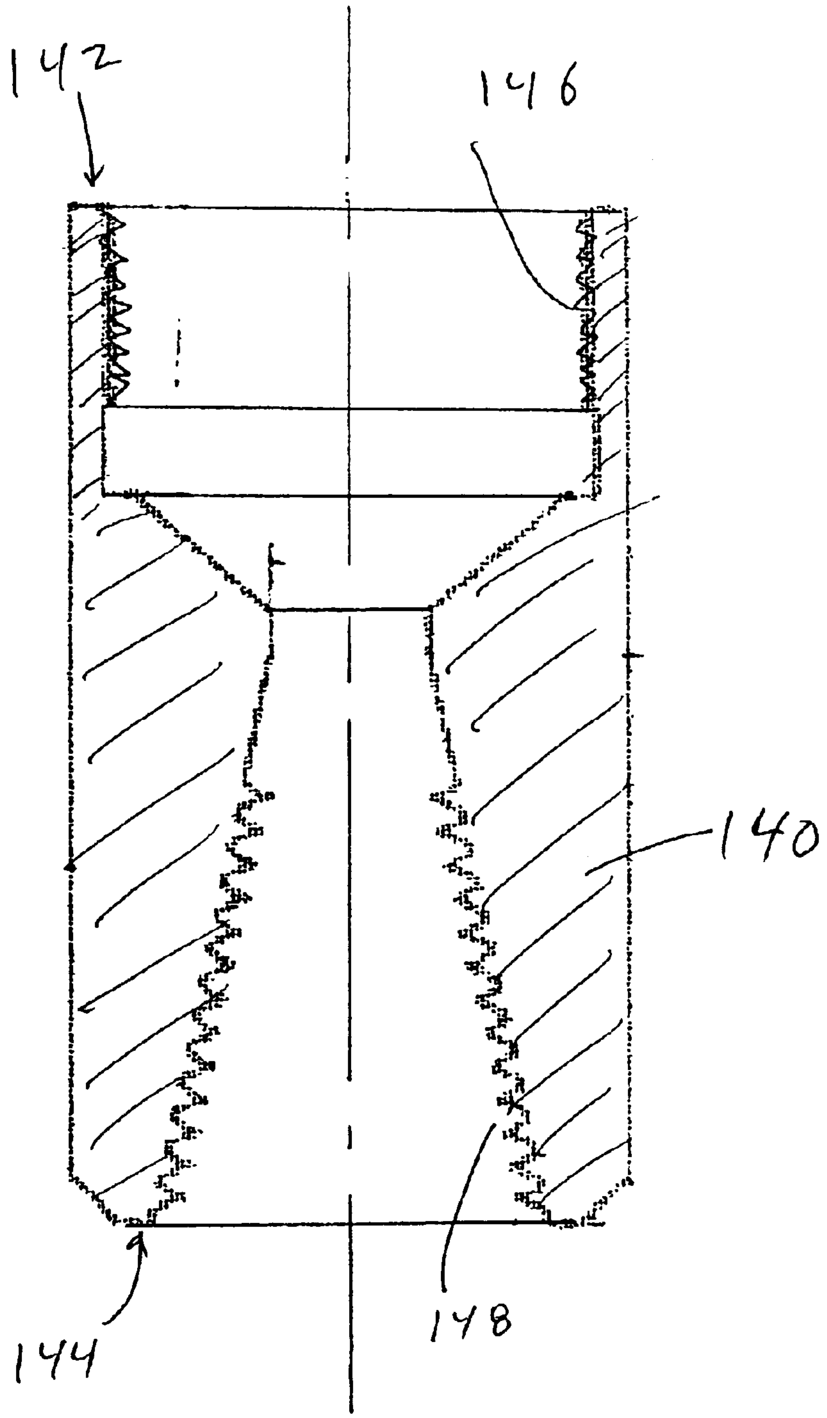
FIG. 12 shows a cross-section elevation view of an example of a lower transition coupling, according to the present invention.

FIG. 12 shows a cross-section elevation view of an example of a lower transition coupling, according to the present invention. Lower coupling 140 comprises a hollow cylindrical body with fine internal threads 146 for coupling to the lower threads 59 of media injector sub-assembly 50 (see FIG. 5). Lower coupling 140 also comprises tapered coarse internal threads 148 for coupling to an optional down-the-hole hammer drive assembly (see FIG. 2).

Figure 13:
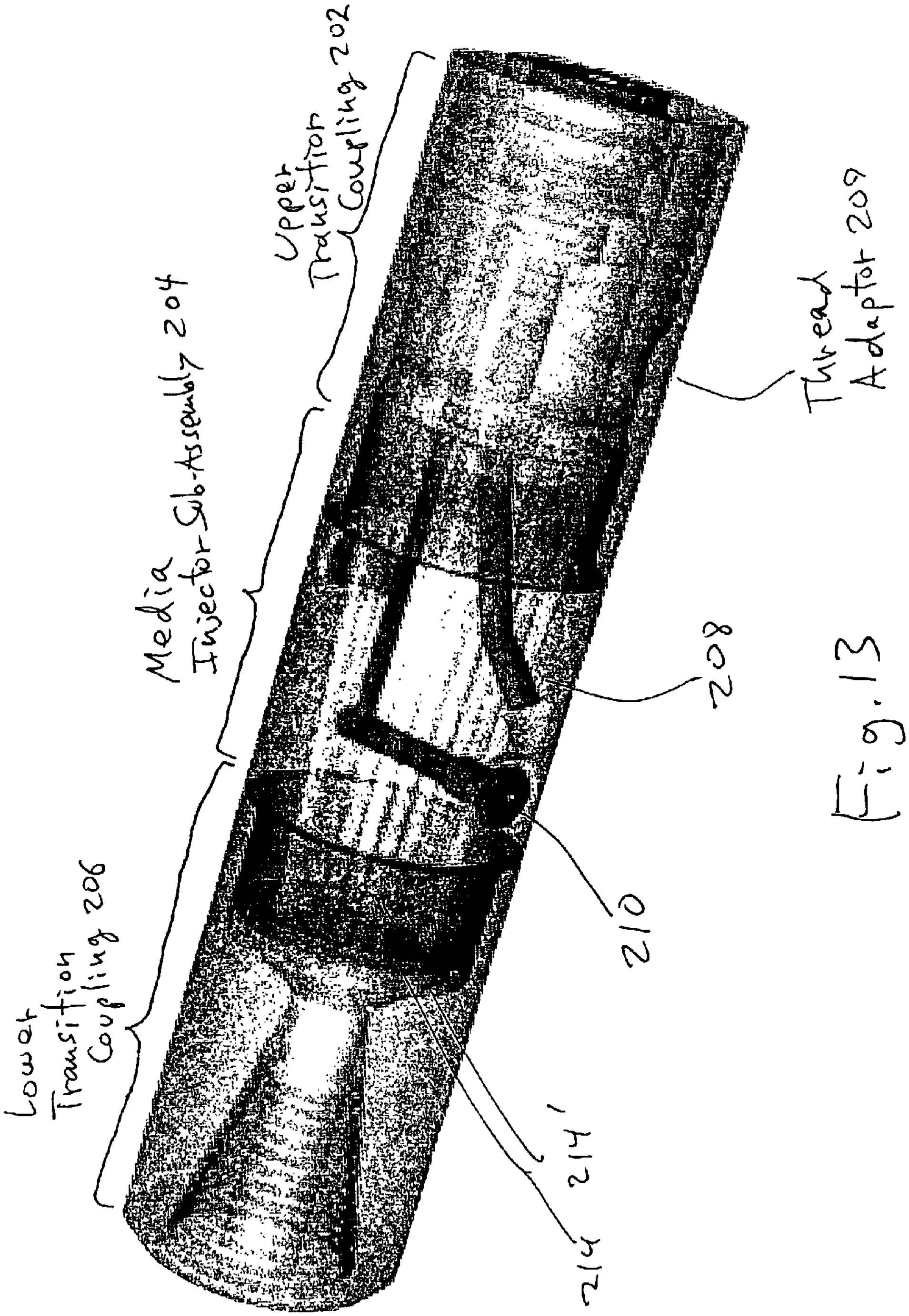
FIG. 13 shows a three-dimensional isometric transparent view of an embodiment of an assembly of components, according to the present invention.

FIG. 13 shows a three-dimensional isometric transparent view of an embodiment of an assembly of components, according to the present invention. Media injector sub-assembly 204 is joined to upper transition coupling 202, which is joined to thread adaptor 209, and sub-assembly 204 is joined to lower transition coupling 206. Jet media injector subassembly 204 comprises a media spray nozzle 208, a mixing spray nozzle 210, an optional cutting spray nozzle 212, and a plurality of third working fluid supply channels 214, 214', etc.

Figure 14A:
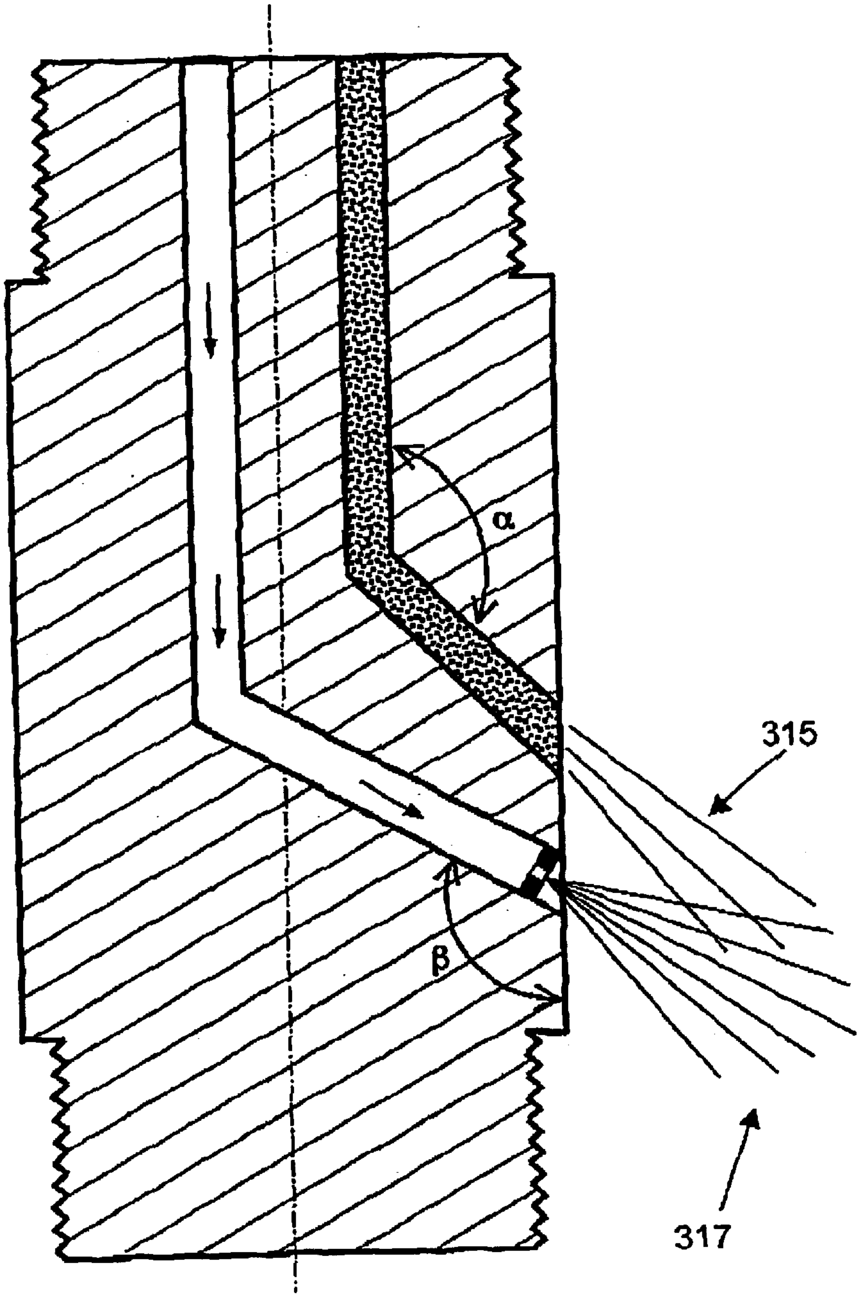
FIG. 14A shows a schematic cross-section view of another embodiment of a media injector sub-assembly, according to the present invention.
Figure 15A:
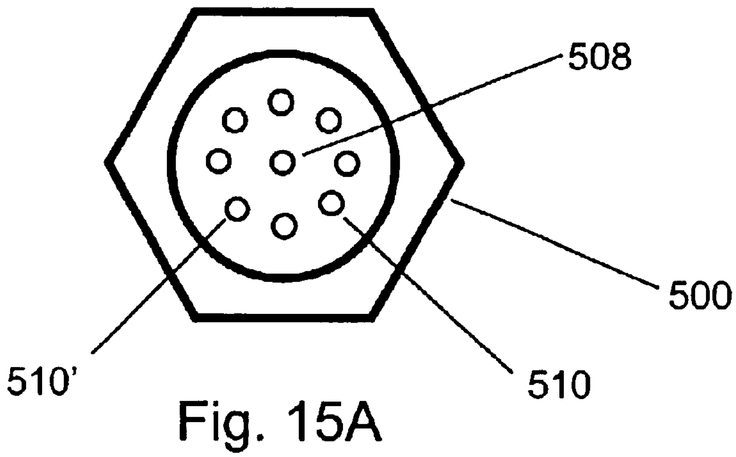
FIG. 15A shows a schematic end view of an embodiment of the mixing fluid jet nozzle, according to the present invention.
Figure 15B:
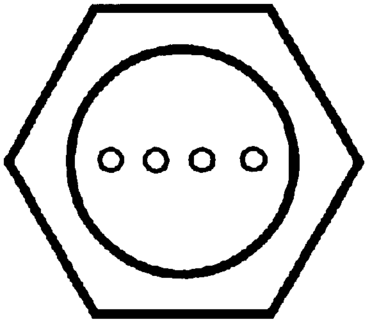
FIG. 15B shows a schematic end view of another embodiment of the mixing fluid jet nozzle, according to the present invention.
Figure 15C:
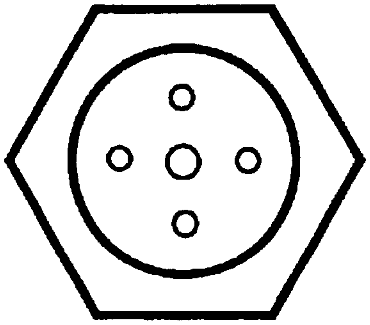
FIG. 15C shows a schematic end view of another embodiment of the mixing fluid jet nozzle, according to the present invention.

FIG. 14A shows a schematic cross-section view of another embodiment of a media injector sub-assembly, according to the present invention. In this embodiment, both the media spray 315 and the mixing spray 317 point in the downward direction, but still intersect in a region close-by to the sub-assembly. Media spray 315 is angled downward at, for example, 45° (i.e., $\phi=45°$), while mixing spray 317 is angled at a slightly smaller angle downwards at, for example, 30° (i.e., $\beta=120°$). Having both spays pointing in the same general direction may help to increase the amount of particulate media entrained in the mixing spray.

Figure 14B:
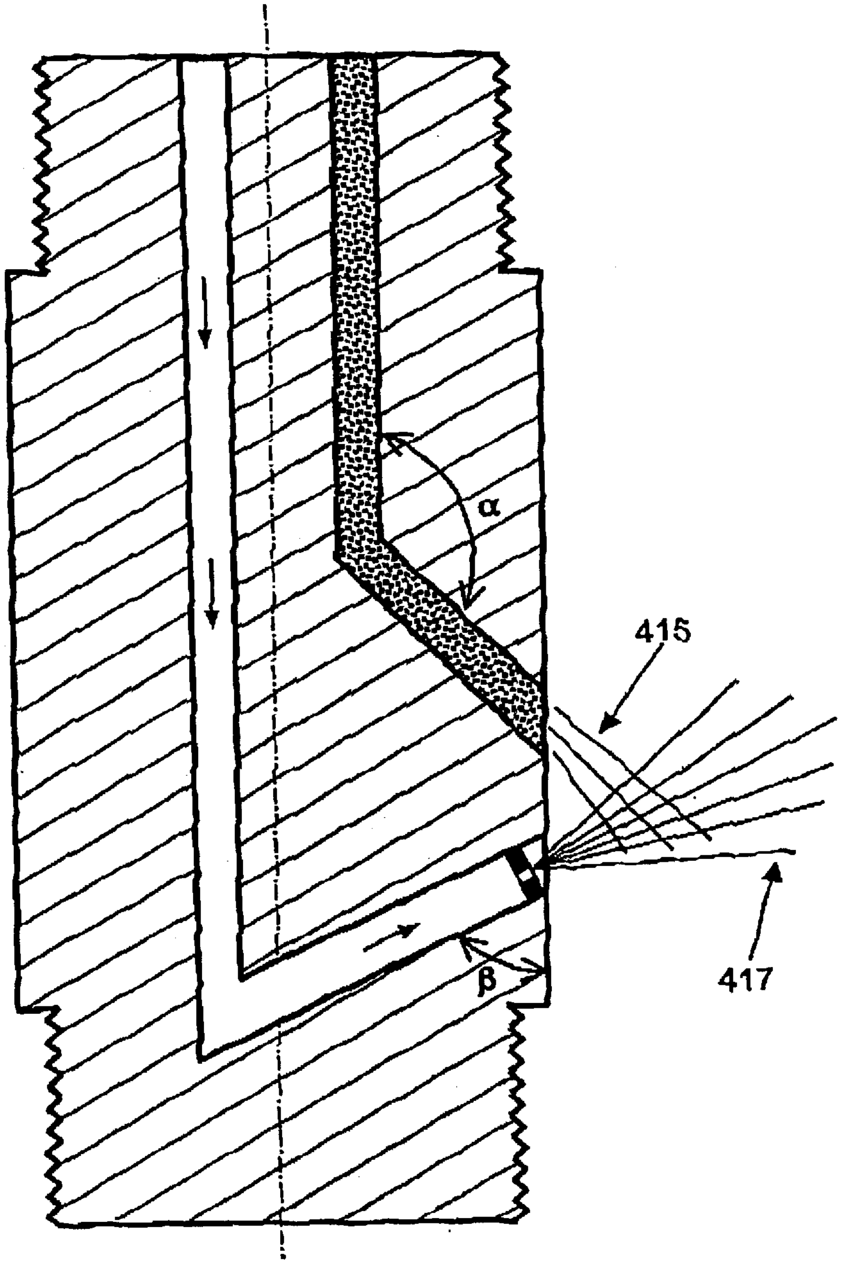
FIG. 14B shows a schematic cross-section view of another embodiment of a media injector sub-assembly, according to the present invention.

FIG. 14B shows a schematic cross-section view of another embodiment of a media injector sub-assembly, according to the present invention. In this embodiment, media spray 415 points in the downward direction (i.e., $\phi<90°$), while mixing spray 417 points in the upward direction (i.e., $\beta<90°$), so that both sprays intersect in an "X"- pattern. Having the two sprays intersect and cross in an "X"-pattern may help to increase the amount of turbulence and mixing that occurs in the combined spray patterns.

FIG. 15A-C show a schematic end view of various embodiments of the mixing fluid jet nozzle, according to the present invention. In FIG. 15A, a central orifice 508 is surrounded by a circle of eight additional orifices 510, 510', etc., which may or may not have the same diameter as the central orifice 508. In FIG. 15B, there are four orifices arranged in a line that is aligned in the horizontal direction. In FIG. 15C, there are four orifices arranged in a diamond pattern. Those of ordinary skill in the art will appreciate that a wide variety of orifice configurations are possible, each providing a different mixing spray geometry, that can be chosen to provide the best configuration optimally tailored to a specific application.

Permeable reactive barrier walls can employ many different treatment mechanisms to treat contaminated groundwater, including: (1) Chemical Precipitation; (2) Oxidation-Reduction Reactions; (3) Zero-Valent Metal Dehalogenation (e.g. granular iron); (4) Biological Degradation Reactions; (5) Sorption of Organics; and (6) Sorption of Inorganics. Some examples of permeable reactive media (PRM) include activated carbon, zeolites, and granular iron.

According to the present invention, the injected media comprises, among other things, permeable reactive media (PRM). The medium carrying the PRM may be dry air. The high-pressure mixing/cutting fluid subsystem may use water, but may also contain inert materials, dissolved materials, and one or more other active agents.

A partial list of reactive agents (PRM's) that may be used for permeable reactive barriers delivered via a carrier medium according to the present invention can be grouped according to their method of treatment, and are discussed below.

Chemical Precipitation

Active agents may include slightly soluble materials containing an ion that forms an insoluble salt (such as a phosphate, sulfate, hydroxide, or carbonate metal salts) with the contaminant. Examples include calcium carbonate (limestone), calcium phosphate (hydroxyapatite), gypsum, and hydrated lime.

Oxidation-Reduction Reactions

Treatment media may be used to change the valence state of an inorganic contaminant, thus reducing solubility and enhancing precipitation. Examples include such reductants as zero-valent metals, hydrogen sulfide, sodium dithionite, and degradable biomass. Also, the strong oxidant potassium permanganate has been used as an oxidizing agent for remediation of chlorinated hydrocarbons.

Zero-Valent Metal Dehalogenation

Here the primary active agent may comprise granular iron, which is used to promote reductive dechlorination of chlorocarbons. The reduction step removes chlorine atoms from the chlorocarbon molecule, releasing chloride and ferrous iron into solution. Granular iron plated with copper, palladium, or sulfur-containing compounds may improve the process.

Biological Degradation Reactions

Biological reduction of sulfate to sulfide by sulfate-reducing bacteria may be used to remove metals from mine tailing water through precipitation as insoluble metallic sulfides. Biological denitrification removes nitrates by converting nitrate to nitrogen gas. Modifying redox conditions increase the rate of biodegradation of some common aromatic hydrocarbons, such as benzene, ethylbenzene, toluene, and xylenes. Active agents may include nitrogen, phosphorus, oxygen, or oxygen release compounds.

Sorption of Organics

Active agents for sorption of organics may include granular activated carbon, peat, coal, and organic-rich shales. The capacity of a porous media to sorb hydrophobic organic solutes is enhanced by injecting a cationic surfactant solution into the subsurface.

Sorption of Inorganics

Materials suitable for sorbing metals may include organic carbon, zeolites, organo-zeolites, aluminosilicate clays, iron/aluminum/manganese oxyhydroxides, and other mineral materials.

Any of the active agents described above may be used alone, or in combination as the active component of the media used in the construction of permeable reactive barriers described herein.

The particular examples discussed above are cited to illustrate particular embodiments of the invention. Other applications and embodiments of the apparatus and method of the present invention will become evident to those skilled in the art. For example, the embodiments described herein generally illustrate a single media injection spray, single mixing fluid spray, and a single (optional) cutting fluid spray. However, multiple numbers of these sprays, in multiple combinations, may be used, and are contemplated by the present invention. In particular, a pair of media injection sprays may be used, located on opposite sides of the media injector sub-assembly. Additionally, or alternatively, a pair of mixing fluid sprays may be used, located on opposite sides of the media injector sub-assembly. Additionally, or alternatively, a pair of cutting fluid sprays may be used, located on opposite sides of the media injector sub-assembly. Also, the media injector sub-assembly can be oriented in any direction other than vertically, i.e., for use in angled drilling operations, including horizontal drilling.

The actual scope of the invention is defined by the claims appended hereto.

What is claimed is:

1. An apparatus for injecting particulate media into the ground, comprising:

a cylindrical body, having a proximal end, a distal end, an outer diameter, and an axial direction;

a media spray nozzle, for spraying particulate media suspended in a carrier fluid radially outwards from the cylindrical body;

a first fluid channel disposed within the body for supplying a flow of particulate media suspended in a carrier fluid to the media spray nozzle;

a mixing spray nozzle, for spraying fluid radially outwards from the cylindrical body;

a second fluid channel disposed within the body for supplying a flow of fluid to the nixing spray nozzle; and a third fluid channel disposed within the body, fluidically connected to a first opening located at the proximal end of the body, and fluidically connected to a second opening located at the distal end of the body, whereby a working fluid can flow from the proximal end of the body to the distal end of body; and further comprising a cuffing spray nozzle, fluidically connected to the second fluid channel, for spraying fluid radially outwards from the cylindrical body.

2. The apparatus of claim 1, wherein the location and orientation of the media spray nozzle is sufficient to satisfy the condition wherein particulate media sprayed from the media nozzle intersects mixing fluid sprayed from the mixing spray nozzle.

3. The apparatus of claim 1, wherein the location and orientation of ge media spray nozzle is sufficient to satisfy the condition wherein a majority of particulate media sprayed from the media spray nozzle is entrained in the spray of mixing fluid.

4. The apparatus of claim 1, wherein the respective centerlines of the media spray nozzle and the mixing spray nozzle intersect at a point whose radial distance, as measured from the outside surface of the cylindrical body is less than or equal to 5 times the et diameter of the media spray nozzle.

5. The apparatus of claim 1, wherein the respective centerlines of the media spray nozzle and the mixing spray nozzle intersect at a point whose radial distance, as measured from the outside surface of the cylindrical body, is less than or equal to the outside diameter of the cylindrical body.

6. The apparatus of claim 1, wherein the respective centerlines of the media spray nozzle and the mixing spray nozzle are separated in the axial direction by a distance that is less than or equal to the outside diameter of the cylindrical body.

7. The apparatus of claim 1, wherein the respective centerlines of the media spray nozzle and the mixing spray nozzle are separated in the axial direction by a distance that is less than or equal to 4 times the exit diameter of the media spray nozzle.

8. The apparatus of claim 1, wherein the media spray nozzle is located at an axial position upstream of the axial position of the mixing spray nozzle.

9. The apparatus of claim 1, wherein the cutting spray nozzle is located at an axial position upstream of the axial position of the media spray nozzle.

10. The apparatus of claim 1, wherein the first fluid channel has no internal bends with an internal bend angle, α, less than 120 degrees.

11. An apparatus for injecting particulate media into the ground, comprising:

a cylindrical body, having a proximal end, a distal end, an outer diameter, and an axial direction;

a media spray nozzle, for spraying particulate media suspended in a carrier fluid radially outwards from the cylindrical body;

a first fluid channel disposed within the body for supplying a flow of particulate media suspended in a carrier fluid to the media spray nozzle;

a mixing spay nozzle, for spraying fluid radially outwards from the cylindrical body;

a second fluid channel disposed within the body for supplying flow of fluid to the nixing spray nozzle; and a third fluid channel disposed within the body, fluidically connected to a first opening located at the proximal end of the body, and fluidically connected to a second opening located at the distal end of the body, whereby a working fluid can flow from the proximal end of the body to the distal end of the body; and further comprising:

an upper transition coupling, attached to the proximal end of the cylindrical body;

a thread adaptor, attached to the proximal end of the cylindrical body; and a lower transition coupling, attached to the distal end of the cylindrical body.

12. The apparatus of claim 11, further comprising:

a triple wall drill string pipe connected to the thread adaptor and contacting eth upper transition coupling; and a down-the-hole hammer drive assembly attached to the distal end of the lower transition coupling.

13. An apparatus for injecting particulate media into the ground, comprising:

a cylindrical body, having a proximal end, a distal end, an outer diameter, and an axial direction;

a media spray nozzle, for spraying particulate media suspended in a carrier fluid radially outwards from the cylindrical body;

a first fluid channel disposed within the body for supplying a flow of particulate media suspended in a carrier fluid to the media spray nozzle;

a mixing spray nozzle, for spraying fluid radially outwards from the cylindrical body; and a second fluid channel disposed within the body for supplying a flow of fluid to the mixing spray nozzle;

wherein the location and orientation of the media spray nozzle is sufficient to satisfy the condition wherein particulate media sprayed from the media spray nozzle intersects mixing fluid sprayed from the mixing spray nozzle; and further comprising a cutting spray nozzle, fluidically connected to the second fluid channel, for spraying fluid radially outwards from the cylindrical body.

14. The apparatus of claim 13, wherein the location and orientation of the media spray nozzle is sufficient to satisfy the condition wherein a majority of particulate media sprayed from the media spray nozzle is entrained in the spray of mixing fluid.

15. The apparatus of claim 13, wherein the location and orientation of the media spray nozzle is sufficient to satisfy the condition wherein greater than 80% of the particulate media sprayed from the media spray nozzle is entrained in the spray of mixing fluid.

16. The apparatus of claim 13, wherein the respective centerlines of the media spray nozzle and the mixing spray nozzle intersect at a point whose radial distance, as measured from the outside surface of the cylindrical body, is less than or equal to 5 times the exit diameter of the media nozzle.

17. The apparatus of claim 13, wherein the respective centerlines of the media spray nozzle and the mixing spray nozzle intersect at a point whose radial distance, as measured from the outside surface of the cylindrical body, is less than or equal to the outside diameter of the cylindrical body.

18. The apparatus of claim 13, wherein the respective centerlines of the media spray nozzle and the mixing spray nozzle are separated in the axial direction by a distance that is less than or equal to the outside diameter of the cylindrical body.

19. The apparatus of claim 13, wherein the respective centerlines of the media spray nozzle and the mixing spray nozzle are separated in the axial direction by a distance that is less than or equal to 4 times the exit diameter of the media spray nozzle.

20. The apparatus of claim 13, wherein the media spray nozzle is located at an axial position upstream of the axial position of the mixing spray nozzle.

21. The apparatus of claim 13, wherein the cutting spray nozzle is located at an axial position upstream of the axial position of the media spray nozzle.

22. The apparatus of claim 13, wherein the first fluid channel has no internal bends with an internal bend angle, β, less than 120 degrees.

23. The apparatus of claim 13, further comprising a third fluid channel disposed within the body, fluidically connected to a first opening located at the proximal end of the body, and fluidically connected to a second opening located at the distal end of the body, whereby a working fluid can flow from the proximal end of the body to the distal end of the body.

24. A method of injecting particulate media into the ground, comprising:

a) supply a media injector sub-assembly comprising:

a cylindrical body, having a proximal end, a distal end, an outer diameter, and an axial direction;

a media spray nozzle, for spraying particulate media suspended in a carrier fluid radially outwards from the cylindrical body;

a first fluid channel disposed within the body for supplying a flow of particulate media suspended in a carrier fluid to the media spray nozzle;

a mixing spray nozzle, for spraying fluid radially outwards from the cylindrical body; and a second fluid channel disposed within the body for supplying flow of fluid to the mixing spray nozzle;

wherein the location and orientation of the media spray nozzle is sufficient to satisfy the condition wherein particulate media sprayed from the media spray nozzle intersects mixing fluid sprayed from the mixing spray nozzle;

b) inserting the media injector sub-assembly to a desired depth into the ground;

c) supplying particulate media suspended in a carrier fluid to the first fluid channel;

d) spraying particulate media suspended in a carrier fluid from the media spray nozzle;

e) supplying mixing fluid to the second fluid channel; and f) spraying mixing fluid from the mixing spray nozzle;

wherein the particulate media being sprayed from the media spray nozzle intersects the mixing fluid being sprayed from the mixing spray nozzle; and wherein the carrier fluid for suspending the particulate media comprises dry air; and wherein the mixing fluid comprises high-pressure water.

25. The method of claim 24, wherein the dry air has a moisture content less than 10% relative humidity.

26. A method of injecting particulate media into the ground, comprising:

a) supplying a media injector sub-assembly comprising:

a cylindrical body, having a proximal end, a distal end, an outer diameter, and an axial direction;

a media spay nozzle, for spraying particulate media suspended in a carrier fluid radially outwards from the cylindrical body;

a first fluid channel disposed within the body for supplying a flow of particulate media suspended in a carrier fluid to the media spray nozzle;

a mixing spray nozzle, for spraying fluid radially outwards from the cylindrical body; and a second fluid channel disposed within the body for supplying a flow of fluid to the mixing spay nozzle;

wherein the location and orientation of the media spray nozzle is sufficient to satisfy the condition wherein particulate media sprayed from the media spray nozzle intersects mixing fluid sprayed from the mixing spray nozzle;

b) inserting the media injector sub-assembly to a desired depth into the ground;

c) supplying particulate media suspended in a carrier fluid to the first fluid channel;

d) spraying particulate media suspended in a carrier fluid from the media spray nozzle;

e) supplying mixing fluid to the second fluid channel; and f) spraying mixing fluid from the mixing spray nozzle;

wherein the particulate media being sprayed from the media spray nozzle intersects the mixing fluid being sprayed from the mixing spray nozzle; and further comprising spraying high-pressure fluid radially outwards from the cylindrical body at an axial position located upstream of the media spray nozzle, for cutting the surrounding ground.

27. The method of claim 26, wherein more than 80% of the particulate media being sprayed from the media spray nozzle is entrained into the mixing fluid being sprayed from the mixing spray nozzle.

28. The method of claim 26, wherein a majority of the particulate media being sprayed from the media spray nozzle is entrained into the mixing fluid being sprayed from the mixing spray nozzle.

* * * * *

UNITED STATES PATENT AND TRADEMARK OFFICE

CERTIFICATE OF CORRECTION

PATENT NO. : 6,834,720 B1 Page 1 of 1
DATED : December 28, 2004
INVENTOR(S) : Dwyer et al.

It is certified that error appears in the above-identified patent and that said Letters Patent is hereby corrected as shown below:

Column 12,
Line 59, replace the word "spays" with -- sprays --.

Column 14,
Line 51, replace the word "nixing" with -- mixing --.
Line 58, replace the word "cuffing" with -- cutting --.
Line 67, replace the word "ge" with -- the --.

Column 15,
Line 8, replace the word "et" with -- exit --.
Line 44, replace the word "spay” with -- spray --.
Line 47, replace the word "nixing" with -- mixing --.
Line 64, replace the word "eth" with -- the --.

Column 17,
Line 6, replace the word "supply" with -- supplying --.

Column 18,
Lines 3 and 12, replace the word "spay” with -- spray --.

Signed and Sealed this

Eighth Day of March, 2005

JON W. DUDAS
*Director of the United States Patent and Trademark Office*